INVENTORS
Harry Bender
Robert Paul Obrecht
Harold Edward Kling
BY
Griswold & Burdick
ATTORNEYS

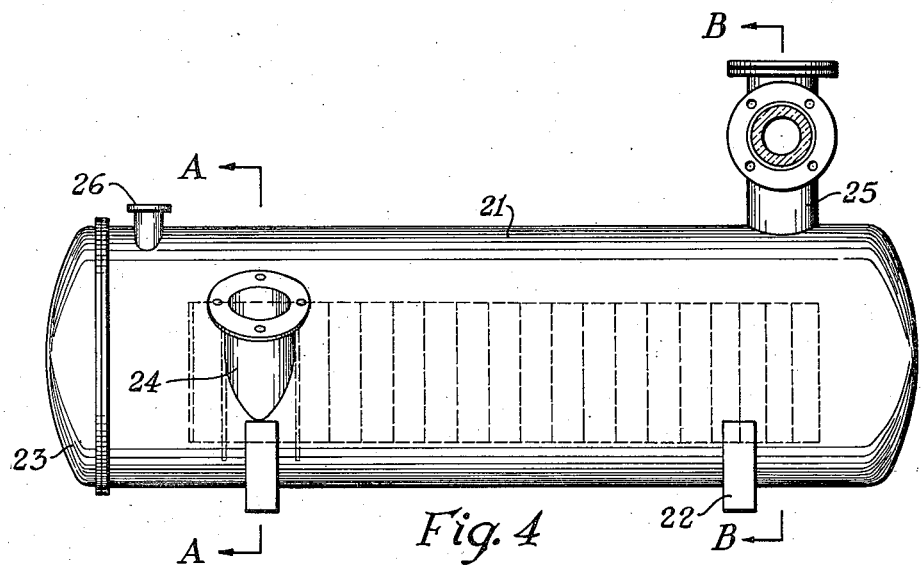
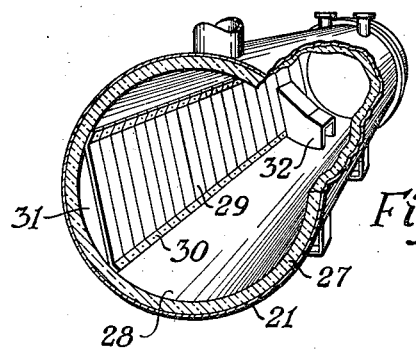
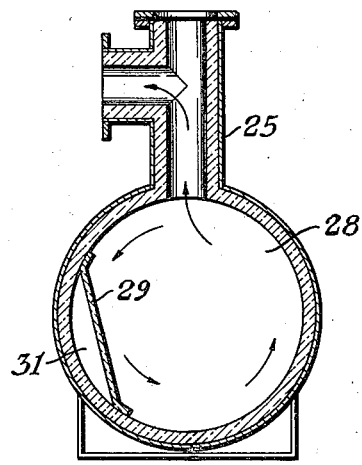
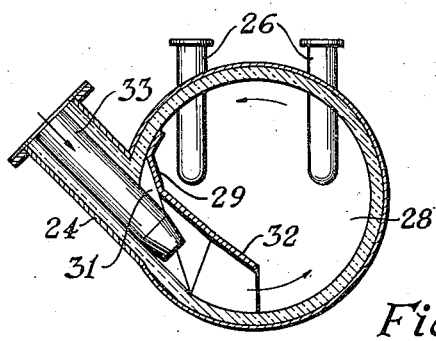
Fig. 4
Fig. 5
Fig. 7
Fig. 6
INVENTORS
Harry Bender
Robert Paul Obrecht
Harold Edward Kling
BY
Griswold & Burdick
ATTORNEYS Patented May 11, 1948

2,441,528

UNITED STATES PATENT OFFICE 2,441,528

GAS REACTOR

Harry Bender, Antioch, Robert Paul Obrecht, Berkeley, and Harold Edward Kling, Antioch, Calif., assignors to The Dow Chemical Company, Midland, Mich., a corporation of Delaware Application March 28, 1945, Serial No. 585,358

2 Claims. (Cl. 23—277)

This invention relates to reactors adapted for carrying out chemical reactions in gas phase, particularly exothermic reactions, and has especial reference to a type of reactor in which the liberated heat of reaction is employed to heat the incoming gases by recycling a portion of the hot reacted gases and mixing it with the incoming gases.

An example of such exothermic gas reaction is the chlorination of methane or other aliphatic hydrocarbon, such as ethane, propane, butane, etc., and mixtures containing the same, such as natural gas or petroleum refinery gases. The present invention is especially adapted for use in conducting such reactions where the object of the reaction is the total or exhaustive chlorination of the hydrocarbon in a single stage.

In the thermal chlorination of methane, for example, where methane is mixed with a sufficient volume of chlorine for total chlorination of the same, in the presence of a diluent gas or vapor to absorb sufficient heat of reaction to prevent an excessive temperature rise, the reaction under proper conditions for control of temperature can be made thermally self-sustaining within a temperature range on the order of about 400° to about 700° C., or higher. The incoming gases, or gas mixture, are usually admitted to the reactor at a temperature low enough to prevent initiation of the reaction prior to entry into the reactor, so that, in effect, the gases are then heated to reaction temperature within the reactor simultaneously with the occurrence of the reaction itself. This calls for immediate and thorough mixing of the incoming gases within the reactor, to prevent channeling or by-passing of unreacted gases and consequent difficulties caused by incomplete or delayed reaction. Irregularities in the flow of gases to the reactor and in their mixing within the reactor cause fluctuations in the position of the zone of maximum temperature, and, if of sufficient magnitude, may cause this reaction zone to strike back into the inlet pipe or to be blown forward into the exit pipe. For smooth and uninterrupted operation a means for controlling the position of the maximum temperature zone is desirable, which is responsive to changes in reaction conditions and which is capable of functioning more or less automatically, either with or without auxiliary manual adjustment.

A principal object of the invention, therefore, is to provide a reactor for gas phase chemical reactions which permits the reaction zone to be maintained within the reactor without striking back or blowing forward, in spite of fluctuations in gas flow and other conditions. Another object is to provide a reactor in which the incoming gases are immediately and thoroughly mixed with the hot reaction gases. Another object is to provide such a reactor which within practical limits is automatically adjustable to variations in flow rate of gases therethrough. Other objects and advantages will appear as the description proceeds. The invention, then, consists in the apparatus hereinafter fully described in the accompanying specification and illustrated in the annexed drawing.

In said drawing:

Fig. 4 is a side elevation of a modified form of apparatus having an internal recirculation passage.

Fig. 5 is a perspective interior view of the apparatus of Fig. 4, with a portion of the wall broken away.

Fig. 6 is a cross section on the line A—A of Fig. 4.

Fig. 7 is a cross section on the line B—B of Fig. 4.

The apparatus of the invention consists in general of an elongated open chamber with gas inlet and outlet, respectively, located near to the opposite ends of the same, and provided with a duct or passageway for recirculating a portion of the hot reaction gases from the outlet end to the inlet end of the reactor. The inlet pipe is in the form of an injector, the suction chamber of which is connected to the recirculation duct, to cause a positive return flow of gas through the duct. Valve means may be provided in the recirculation duct to regulate the gas flow therethrough. The recirculation duct may be either an external pipe, as shown in Figs. 1–3, or an internal passageway, as shown in Figs. 4–7.

Figure 1:
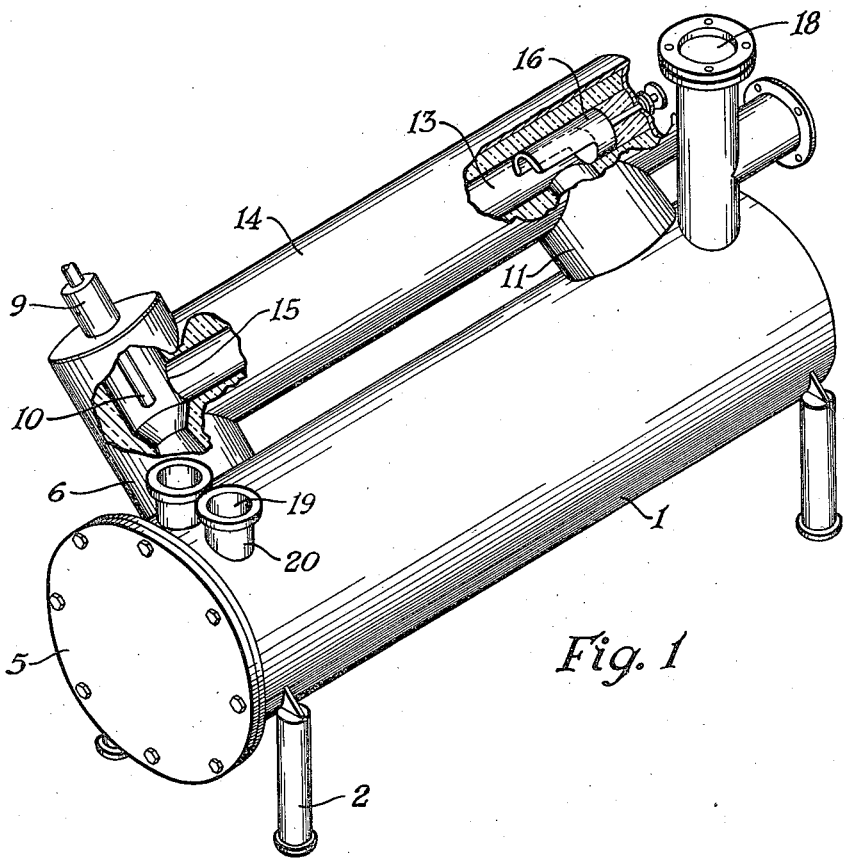
Fig. 1 is an isometric view of one form of the apparatus equipped with an external recirculation pipe or duct, with certain portions broken away to show interior construction.
Figure 2:
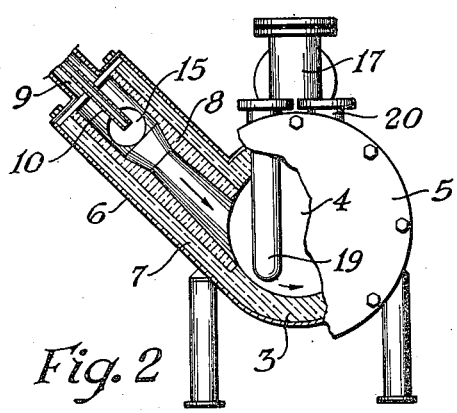
Fig. 2 is a front end elevation of the apparatus of Fig. 1, with a portion broken away showing the gas inlet in cross section.
Figure 3:
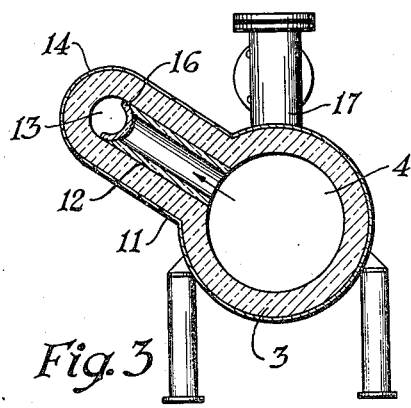
Fig. 3 is a cross section of the apparatus of Fig. 1, showing the connection to the recirculation duct.

Referring to the modification shown in Figs. 1–3, the reactor body consists of a cylindrical vessel 1 of steel supported on legs 2 and provided with a heat-insulating lining 3 of refractory material enclosing a reaction chamber 4. The reactor is closed at the rear end, and flanged at the front end for attachment of a head or cover 5. Near the front end is a tangentially disposed inlet 6 having a heat-insulating lining 7 enclosing a Venturi tube 8 of refractory material. An insulated gas feed pipe 9 is connected to inlet 6, the end 10 of pipe 9 protruding as a nozzle into Venturi tube 8. An insulated lateral connection 11 toward the rear end of cylinder 1 encloses pipe 12, which is radially disposed with respect to chamber 4. Pipe 12 communicates with a pipe or duct 13, which is axially parallel to chamber 4, and enclosed within an insulated jacket 14. Duct 13, in turn, communicates with Venturi tube 8 through an opening 15. The connection between pipe 12 and duct 13 is controllable by means of angle valve 16, the latter being shown in open position in Fig. 1 and in closed position in Fig. 3.

At the rear of cylinder 1 is gas outlet connection 17 communicating with chamber 4, and formed of a branched fitting, the vertical branch of which, as shown, is provided with a flanged attachment holding a frangible safety disc 18, while the horizontal branch is for connection to a pipe for carrying off the exit gases from the reactor.

At the forward end of the reactor are two light wells 19 of transparent heat-resistant material, e. g., Pyrex glass, which are inserted within chamber 4 by gas-tight seal through nipples 20 secured in the wall of cylinder 1. The light wells 19 are closed at the bottom, and are intended for the insertion of ultraviolet lamps for starting the gas reaction by exposing the gases in the reactor to the actinic rays. Ordinarily the lamps are not required after the gas reaction is under way and the temperature within the reactor has risen to the operating level.

The modified form of apparatus shown in Figs. 4–7 is provided with an internal recirculation duct. The main body of the apparatus is a cylindrical shell 21, resting on supports 22, closed at one end and having a removable head 23 at the other end. Near the forward end is a tangential gas inlet 24, and near the rear end is a gas exit pipe 25. Light wells 26 are located at the forward end near the inlet. The view in Fig. 5 is taken from the closed exit end of Fig. 4 looking toward the inlet end thereof. A heat-insulating lining 27 inside of shell 21 defines a reaction chamber 28. Along the inlet side of chamber 28 is a partition 29 extending from a point forward of inlet 24 to one rearward from gas exit 25. Partition 29 may be formed of slabs of refractory material, such as graphite, secured by strips 30 against the chamber wall, forming a passageway or duct 31 extending along the wall.

Duct 31 is closed at the end adjacent inlet 24, but open at the end adjacent the exit pipe 25. The open end of duct 31 may, if desired, be controlled by a flap valve, or the like (not shown), for regulating gas flow therethrough.

Communication is established between duct 31 and chamber 28 at the inlet end through a port 32, which opens into chamber 28 at about the center line thereof. An eductor tube 33 (Fig. 6) of refractory metal is set into the inlet 24, as shown, forming with the walls of the inlet an injector through which the feed gases are introduced into chamber 28. Gas exit pipe 25 opens out of the top of chamber 28, and is shown in branched form, one branch equiped for holding a frangible safety disc and the other for connection to a pipe for carrying away the exit gases.

The principle of operation of the two modifications of the apparatus described above is the same in either case. The incoming gas or gas mixture at suitable velocity, e. g., 100 to 200 feet per second, is introduced into the reaction chamber through the eductor tube, creating a suction within the injector which causes gas to flow from the exit end of the reactor through the recirculation duct into the eductor tube, wherein the recirculated gas is mixed with the incoming gas. Thus, during operation of the reactor with continuous gas flow through the same, a portion of the hot reaction gases is continuously recirculated back to the inlet and intimately mixed with incoming gases. This thorough mixing of hot reaction gases with the incoming gases heats the latter nearly to reaction temperature, so that reaction of the fresh gases is initiated throughout the mass immediately as the gases enter the reactor. After having once adjusted the rate of gas flow to the volumetric capacity of the reactor, operation is substantially self-regulating, minor fluctuations in gas pressure and rate of flow being automatically compensated by corresponding variations in the rate of recirculation of reaction gases. Thus, an increase of pressure or velocity of the feed gases increases the suction on and flow of the recirculated gases, and conversely, when the feed gas pressure or velocity is lowered. Consequently, the relative volume of recirculated gases is held approximately constant. When necessary, adjustment for larger changes in flow rate and composition of input gases can be made by regulating the valve in the recirculation duct. The result is that the reaction zone of highest temperature within the reactor can be set at any desired point along the length of the reactor and held closely in that position without danger of striking back or blowing out, with little or no manual adjustment of valve controls.

We claim:

1. A reactor for gas phase reactions comprising the combination of an elongated reaction chamber, a gas inlet tangentially disposed adjacent to one end of said chamber, said inlet being in the form of an injector, a gas outlet near the opposite end of the chamber, and a recirculating duct extending from the outlet end of said chamber to the suction side of said injector.

2. A reactor for gas phase reactions comprising the combination of an elongated reaction chamber, a gas inlet tangentially disposed adjacent to one end of said chamber, said inlet being in the form of an injector, a gas outlet near the opposite end of the chamber, a recirculating duct extending from the outlet end of said chamber to the suction side of said injector, and a control valve in said duct.

HARRY BENDER.
ROBERT PAUL OBRECHT.
HAROLD EDWARD KLING.

REFERENCES CITED

The following references are of record in the file of this patent:

UNITED STATES PATENTS

| Number | Name | Date |
| --- | --- | --- |
| 1,888,028 | Dubbs | Nov. 15, 1932 |
| 1,893,913 | Saint-Jacques | Jan. 10, 1933 |
| 2,025,402 | Saint-Jacques | Dec. 24, 1935 |
| 2,028,684 | Pohl | Jan. 21, 1936 |
| 2,127,571 | Pardee | Aug. 23, 1938 |